US008194727B2

(12) United States Patent
Yamazaki et al.

(10) Patent No.: US 8,194,727 B2
(45) Date of Patent: Jun. 5, 2012

(54) EQUALIZER CHARACTERISTICS OPTIMIZING METHOD AND TRANSMISSION SYSTEM

(75) Inventors: Manabu Yamazaki, Kawasaki (JP); Masaki Tosaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 363 days.

(21) Appl. No.: 12/585,619

(22) Filed: Sep. 18, 2009

(65) Prior Publication Data
US 2010/0008413 A1   Jan. 14, 2010

Related U.S. Application Data

(63) Continuation of application No. PCT/JP2007/056398, filed on Mar. 27, 2007.

(51) Int. Cl.
    *H03K 5/159* (2006.01)
(52) U.S. Cl. ...................................... 375/232
(58) Field of Classification Search .......... 375/231, 375/232, 233, 350
    See application file for complete search history.

(56) References Cited

U.S. PATENT DOCUMENTS

| 6,282,042 B1* | 8/2001 | Hana et al. ............ 360/64 |
| 7,697,649 B2 | 4/2010 | Okamura |
| 2005/0226355 A1 | 10/2005 | Kibune et al. |
| 2007/0041454 A1 | 2/2007 | Yamazaki |
| 2008/0130806 A1* | 6/2008 | Chou et al. ............ 375/350 |
| 2008/0192814 A1* | 8/2008 | Hafed et al. ............ 375/224 |

FOREIGN PATENT DOCUMENTS

| JP | 62-130037 | 6/1987 |
| JP | 62-159545 | 7/1987 |
| JP | 9-073724 | 3/1997 |
| JP | 2005-303607 | 10/2005 |
| JP | 2007-53648 | 3/2007 |
| JP | 2007-60655 | 3/2007 |

OTHER PUBLICATIONS

English Translation of JP 2007-60655. Translated Nov. 10, 2011.*
International Search Report for PCT/JP2007/056398, mailed Jul. 10, 2007.
Japanese Office Action issued Apr. 19, 2011 in corresponding Japanese Patent Application 2009-506154.

* cited by examiner

*Primary Examiner* — Don N Vo
(74) *Attorney, Agent, or Firm* — Fujitsu Patent Center

(57) ABSTRACT

An equalizer characteristics optimizing method includes acquiring a recovery clock timing from a reception signal; acquiring a predetermined sampling clock timing with respect to the recovery clock timing; latching the reception signal at the recovery clock timing; latching the reception signal at the sampling clock timing; comparing logic values obtained in the latching steps; collecting, after changing a characteristics setting of an equalizer, logic value comparison result data by repeating the recovery clock acquiring step, the acquiring of the sampling clock timing, the latching of the reception signal at the individual clock timings, and the comparing of the logic values, using the changed characteristics setting; and determining an optimum characteristics setting of an equalizer based on the collected logic value comparison result data.

7 Claims, 16 Drawing Sheets

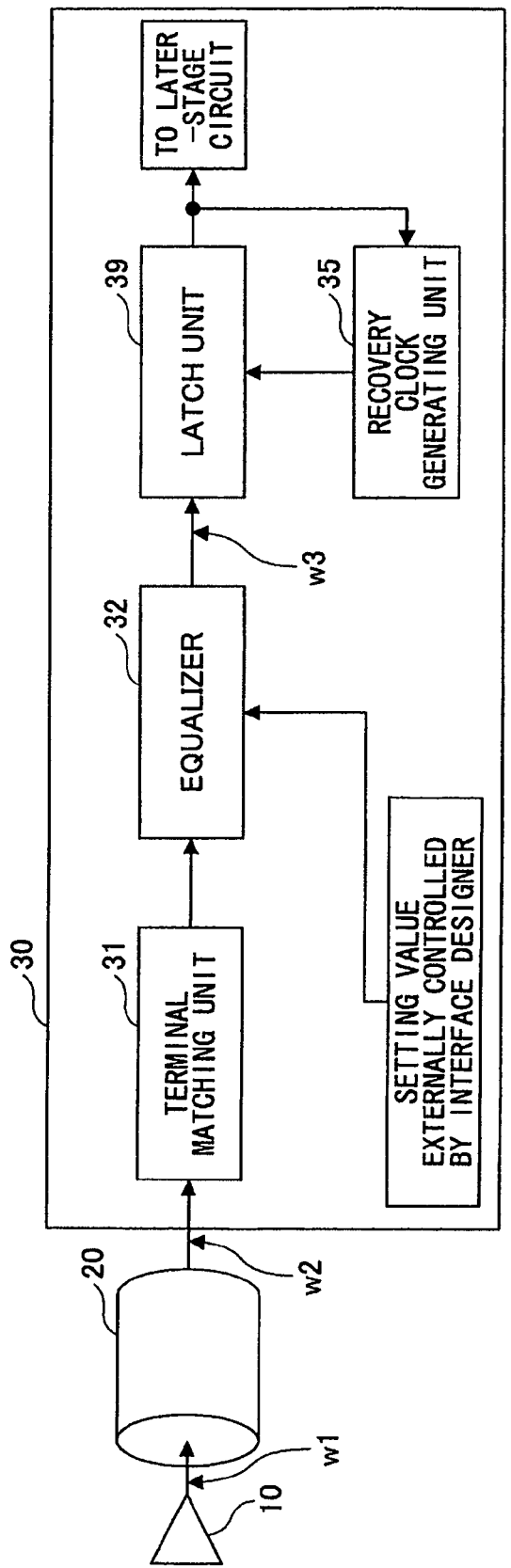

TRANSMITTING-END WAVEFORM

TRANSMITTING-END WAVEFORM (EYE PATTERN)

RECEIVING-END WAVEFORM

FIG.1E
RECEIVING-END WAVEFORM (EYE PATTERN)
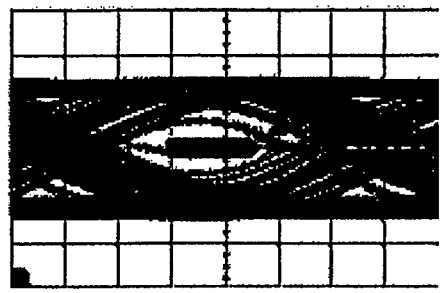
FIG.1F
EQUALIZER OUTPUT WAVEFORM
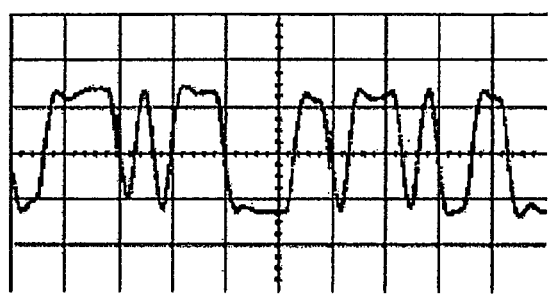
FIG.1G
EQUALIZER OUTPUT WAVEFORM (EYE PATTERN)
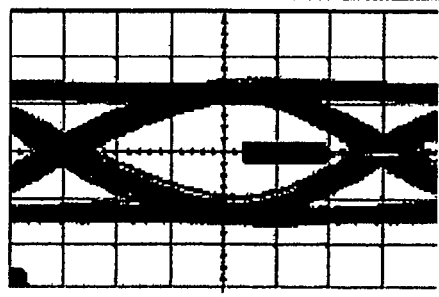
RECOVERY CLOCK

RECEIVING-END WAVEFORM (EYE PATTERN)

EQUALIZER OUTPUT WAVEFORM (EYE PATTERN)

RECOVERY CLOCK SIGNAL

SAMPLING CLOCK SIGNAL

| n\m | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | | | | | | | | | | | | | | | | | | | | | | | | | | | | | | | | |
| 1 | | | | | | | | | | | | | | | | | | | | | | | | | | | | | | | | |
| 2 | | | 0 | | | | 1 | | | | 2 | | | | 3 | | | | 3 | | | | 2 | | | | 0 | | | | 0 | |
| 3 | | | | | | | | | | | | | | | | | | | | | | | | | | | | | | | | |
| 4 | | | | | | | | | | | | | | | | | | | | | | | | | | | | | | | | |
| 5 | | | 0 | | | | 1 | | | | 2 | | | | 4 | | | | 4 | | | | 2 | | | | 1 | | | | 0 | |
| 6 | | | | | | | | | | | | | | | | | | | | | | | | | | | | | | | | |
| 7 | | | | | | | | | | | | | | | | | ★ | ☆ | | | | | | | | | | | | | | |
| 8 | | | 0 | | | | 0 | | | | 2 | | | | 4 | | | | 4 | | | | 2 | | | | 1 | | | | 0 | |
| 9 | | | | | | | | | | | | | | | | | | | | | | | | | | | | | | | | |
| 10 | | | | | | | | | | | | | | | | | | | | | | | | | | | | | | | | |
| 11 | | | 0 | | | | 0 | | | | 1 | | | | 2 | | | | 2 | | | | 1 | | | | 0 | | | | 0 | |
| 12 | | | | | | | | | | | | | | | | | | | | | | | | | | | | | | | | |
| 13 | | | | | | | | | | | | | | | | | | | | | | | | | | | | | | | | |
| 14 | | | 0 | | | | 0 | | | | 0 | | | | 0 | | | | 0 | | | | 0 | | | | 0 | | | | 0 | |
| 15 | | | | | | | | | | | | | | | | | | | | | | | | | | | | | | | | |
| 16 | | | | | | | | | | | | | | | | | | | | | | | | | | | | | | | | |
| 17 | | | 0 | | | | 0 | | | | 0 | | | | 0 | | | | 0 | | | | 0 | | | | 0 | | | | 0 | |
| 18 | | | | | | | | | | | | | | | | | | | | | | | | | | | | | | | | |
| 19 | | | | | | | | | | | | | | | | | | | | | | | | | | | | | | | | |
| 20 | | | 0 | | | | 0 | | | | 0 | | | | 0 | | | | 0 | | | | 0 | | | | 0 | | | | 0 | |
| 21 | | | | | | | | | | | | | | | | | | | | | | | | | | | | | | | | |
| 22 | | | | | | | | | | | | | | | | | | | | | | | | | | | | | | | | |
| 23 | | | 0 | | | | 0 | | | | 0 | | | | 0 | | | | 0 | | | | 0 | | | | 0 | | | | 0 | |
| 24 | | | | | | | | | | | | | | | | | | | | | | | | | | | | | | | | |
| 25 | | | | | | | | | | | | | | | | | | | | | | | | | | | | | | | | |
| 26 | | | | | | | | | | | | | | | | | | | | | | | | | | | | | | | | |
| 27 | | | | | | | | | | | | | | | | | | | | | | | | | | | | | | | | |
| 28 | | | | | | | | | | | | | | | | | | | | | | | | | | | | | | | | |
| 29 | | | | | | | | | | | | | | | | | | | | | | | | | | | | | | | | |
| 30 | | | | | | | | | | | | | | | | | | | | | | | | | | | | | | | | |
| 31 | | | | | | | | | | | | | | | | | | | | | | | | | | | | | | | | | n : EQ1 CHARACTERISTICS SETTING VALUE m : EQ2 CHARACTERISTICS SETTING VALUE

EQUALIZER CHARACTERISTICS OPTIMIZING METHOD AND TRANSMISSION SYSTEM

CROSS-REFERENCE TO RELATED APPLICATIONS

This application is a U.S. continuation application filed under 35 USC 111 (a) claiming benefit under 35 USC 120 and 365(c) of PCT application JP07/056,398, filed Mar. 27, 2007. The foregoing application is hereby incorporated herein by reference.

FIELD

The present invention generally relates to equalizer characteristics optimizing methods and transmission systems.

BACKGROUND

In a known technology for automatically adjusting the characteristics of an equalizer to which a digital signal is supplied, an equalization parameter for the equalizer (which may include an amplitude equalizer or a phase equalizer) is generated by a CPU. Specifically, the CPU receives data indicating the number of C1 errors corrected by an error correction code, and then determines, by the hill-climbing method, an equalization parameter that minimizes an equalization error.

In this technology, a Viterbi decoder is turned off by the CPU during the automatic adjusting operation so that a single-symbol error is not corrected by Viterbi decoding. This causes the C1 error number to change more sensitively in response to a change in equalization error. As a result, a quick automatic adjustment can be made and the resolution of the C1 error number is improved, thereby enabling an accurate adjustment.

Patent Document 1: Japanese Laid-Open Patent Application No. 2007-53648
Patent Document 2: Japanese Laid-Open Patent Application No. 62-130037
Patent Document 3: Japanese Laid-Open Patent Application No. 62-159545
Patent Document 4: Japanese Laid-Open Patent Application No. 9-73724

SUMMARY

The object and advantages of the disclosure will be realized and attained by means of the elements and combinations particularly pointed out in the claims.

It is to be understood that both the foregoing general description and the following detailed description are exemplary and explanatory and are not restrictive of the invention, as claimed.

According to one aspect of the present invention, an equalizer characteristics optimizing method includes acquiring a recovery clock timing from a reception signal whose frequency characteristics are compensated by an equalizer; acquiring a predetermined sampling clock timing with respect to the recovery clock timing; latching, at the recovery clock timing, the reception signal whose frequency characteristics are compensated by the equalizer; latching, at the sampling clock timing, the reception signal whose frequency characteristics are compensated by the equalizer; comparing a logic value obtained by the latching, at the recovery clock timing, with a logic value obtained by the latching, at the sampling clock timing; collecting logic value comparison result data by repeating, after a characteristics setting of the equalizer is changed, the acquiring a recovery clock timing, the acquiring a predetermined sampling clock timing, the latching, at the recovery clock timing, the latching, at the sampling clock timing, and the comparing, with regard to the reception signal whose frequency characteristics are compensated by the equalizer with the changed characteristics setting; and determining an optimum characteristics setting of the equalizer based on the logic value comparison result data collected by the collecting logic value comparison result data.

According to another aspect of the present invention, an equalizer characteristics optimizing method includes comparing logic values obtained by latching, at a recovery clock timing and a sampling clock timing, a reception signal whose frequency characteristics are compensated by an equalizer; generating the recovery clock timing based on a comparison result obtained by the comparing; generating the sampling clock timing with respect to the recovery clock timing; collecting logic value comparison result data by repeating, after a characteristics setting of the equalizer is changed, the generating the recovery clock timing, the generating the sampling clock timing, the latching, and the comparing, with regard to the reception signal whose frequency characteristics are compensated by the equalizer with the changed characteristics setting; and determining an optimum characteristics setting of the equalizer based on the logic value comparison result data collected by the collecting logic value comparison result data.

According to yet another aspect of the present invention, a transmission system includes a transmission interface having a function of optimizing characteristics of an equalizer; a logic value comparing unit configured to compare logic values obtained by latching, at a recovery clock timing and a sampling clock timing, a reception signal whose frequency characteristics are compensated by the equalizer; a recovery clock generating unit configured to generate the recovery clock timing based on a comparison result obtained by the logic value comparing unit; a sampling clock generating unit configured to generate the sampling clock timing with respect to the recovery clock timing; a frequency characteristics control unit configured to collect logic value comparison result data by repeating, after a characteristics setting of the equalizer is changed, generation of the recovery clock timing by the recovery clock generating unit, generation of the sampling clock timing by the sampling clock generating unit, the latching, and comparison of logic values by the logic value comparing unit, with regard to the reception signal whose frequency characteristics are compensated by the equalizer with the changed characteristics setting; and an optimum setting determining unit configured to determine an optimum characteristics setting of the equalizer based on the logic value comparison result data collected by the frequency characteristics control unit.

BRIEF DESCRIPTION OF DRAWINGS

FIG. 1A depicts a block diagram of an interface;
FIG. 1E depicts an eye pattern of the receiving-end waveform depicted in FIG. 1D;

FIG. 1F depicts an equalizer output waveform in the interface depicted in FIG. 1A;

FIG. 1G depicts an eye pattern (top) of the equalizer output waveform depicted in FIG. 1F, and a waveform (bottom) of a recovery clock signal obtained from an equalizer output signal having the equalizer output waveform of FIG. 1F;

FIGS. 3A through 3F depict waveforms illustrating the operation of FIG. 2;

FIG. 5 depicts an example of table data of results of comparison of logic values for setting the equalizer characteristics, for describing the operation of FIG. 2;

FIG. 8 illustrates a relationship between logic value comparison results obtained by the operation of FIG. 6 and the determination of the center of gravity of the data;

FIG. 10 illustrates a relationship between logic value comparison results obtained by the operation of FIG. 9 and the determination of the center of gravity of the data;

DESCRIPTION OF EMBODIMENTS

Figure 1B:
FIG. 1B depicts a transmitting-end waveform in the interface depicted in FIG. 1A.

The present invention particularly relates to a receiver equalizer characteristics optimizing technique that can be applied to serial interfaces that use high-frequency bands where loss or a jitter presents a problem.

Interfaces are rapidly transitioning from parallel interfaces to serial interfaces. For example, PCI (Peripheral Component Interconnect) and PCI-X (PCT eXtended) used in personal computers and servers are being replaced by PCI Express, while ATA (Advanced Technology Attachment) that has been used for connection with storage devices, such as HDDs (hard disk drives) and CD-ROMs, is being replaced by Serial ATA. Similarly, SCSI is being replaced by Serial Attached SCSI.

Because such serial interfaces use high-frequency bands, an equalizer characteristics optimizing method is required in order to optimize the characteristics of an equalizer in a receiver so that the receiver can correctly receive a waveform distorted by the frequency characteristics of a transmission path.

FIG. 1A shows a block diagram of a serial interface that includes a transmitter 10 for outputting a signal; a transmission path 20 which may include a printed circuit board, a connector, and a cable; and a receiver 30 for receiving the signal.

The receiver 30 includes a matching terminal unit 31 for matching characteristic impedances; an equalizer 32 for shaping a waveform of the reception signal by compensating the frequency characteristics thereof; a recovery clock generating unit 35 for extracting a recovery clock signal from the reception signal shaped by the equalizer 32; and a latch unit 39 for latching the reception signal using the recovery clock signal.

In this interface, the waveform of the reception signal at the receiver 30, i.e., a receiving-end waveform W2, is optimized by the designer of the interface either by controlling the gain of a predetermined frequency band, by using a waveform shaping function of the transmitter 10, or by controlling the frequency characteristics of the transmission path 20.

However, as the transmission rate of the interface increases, it becomes increasingly difficult to maintain a required transmission quality by the optimization of the receiving-end waveform based on the control of the characteristics of the transmitter 10 or the transmission path 20. Thus, the equalizer 32 is provided in the receiver 30 in order to control the gain in a certain frequency band of the reception signal so that a required transmission quality can be ensured.

Figure 1C:
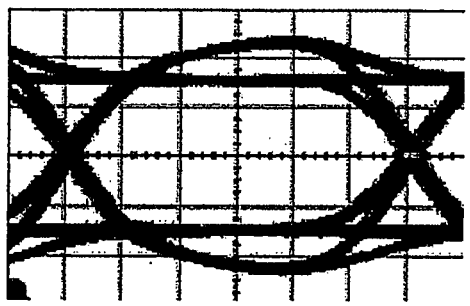
FIG. 1C depicts an eye pattern of the transmitting-end waveform depicted in FIG. 1B.
Figure 1D:
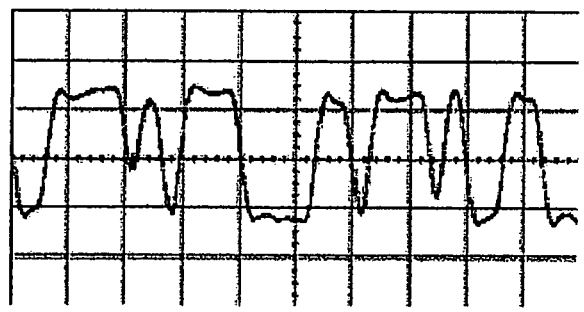
FIG. 1D depicts a receiving-end waveform in the interface depicted in FIG. 1A.

FIGS. 1B and 1C depict examples of output waveforms of a transmitting-end waveform W1 of the transmitter 10. As depicted, a high-frequency component that is lost in the transmission path 20 is pre-emphasized by the transmitter 10. FIGS. 1D and 1E depict examples of waveforms of the receiving-end waveform W2 received by the receiver 30 via the transmission path 20. As depicted, higher-frequency components are increasingly lost, resulting in a distortion.

Within the receiver 30, the waveform degraded by the transmission path 20 is shaped by controlling the characteristics of the equalizer 32 depending on the amount of loss or distortion produced in the transmission path 20, for example. Specifically, the characteristics of the equalizer 32 are controlled so that the waveforms depicted in FIGS. 1F and 1G, for example, can be obtained.

The recovery clock generating unit 35 extracts, from a resultant reception signal depicted in FIG. 1F and in the upper half of FIG. 1G, a recovery clock signal depicted in the lower half of FIG. 1G. The rise timing of the recovery clock signal that is extracted is aligned with the center of an eye pattern (top of FIG. 1G) obtained from the waveform of the output signal of the equalizer. By latching the reception signal in the latch unit 39 with respect to the rise timing of the recovery clock signal, the reception signal can be reliably latched, whereby the data carried by the reception signal can be reliably reproduced.

However, because the transmission signal has a very high frequency band, it is generally difficult to accurately monitor an equalizer output of the receiver 30. Thus, it has been necessary to monitor the value of an error counter that counts up upon detection of an error by the receiver 30, or detect a re-transmission request that is issued upon detection of an error by the receiver 30. In another example, a protocol analyzer is connected on the transmission path 20 to monitor an error frequency. Then, a relationship between such error frequency data and an equalizer characteristics setting value of the receiver 30 is statistically analyzed. Based on a result of statistical analysis, a setting range that causes no error is derived, and optimum setting values for the equalizer characteristics are obtained from that range.

However, in order to optimize the setting values of the equalizer 32 in the receiver 30 by thus measuring an error rate, the error rate needs to be measured repeatedly while changing the setting values of the equalizer 32, requiring a large number of process steps.

Furthermore, when there are plural channels with different conditions of the transmission path 20, or when there are variations in the characteristics of the receiver 30 or the transmitter 10, the optimum setting values for the equalizer 32 of the receiver 30 may not be uniquely determined. In such cases, a very large number of steps are required for determining plural equalizer setting values optimized for plural conditions.

Referring now to the drawings, wherein like reference numerals designate identical or corresponding parts throughout the several views, embodiments of the present invention are described.

Figure 2:
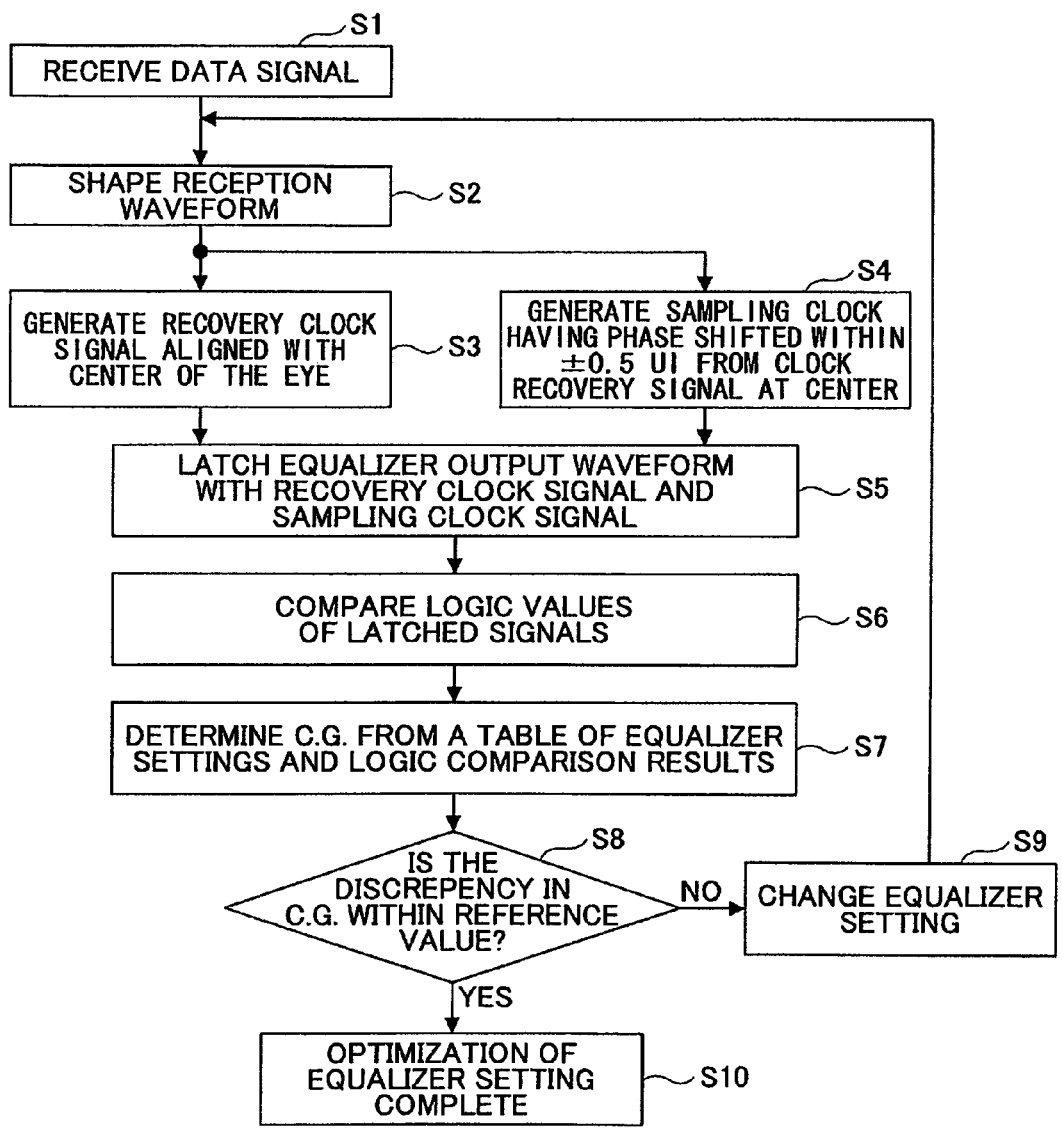
FIG. 2 is a flowchart of an operation according to an equalizer characteristics optimizing method according to an embodiment of the present invention.

FIG. 2 is a flowchart illustrating an equalizer characteristics optimizing method according to an embodiment of the present invention. FIGS. 3A through 3F depict signal waveforms for describing an operation according to the method. FIG. 4 is a block diagram of a receiver 30A according to an embodiment of the present invention having functions for implementing the equalizer characteristics optimizing method.

As depicted in FIG. 4, the receiver 30A includes, in addition to the matching terminal unit 31, the equalizer 32, and the recovery clock generating unit 35 that have similar structures as those of the above-discussed receiver 30, a sampling clock generating unit 34, a table unit/filter unit 36, and an equalizer characteristics control unit 37.

As in the case of the aforementioned receiver 30 discussed with reference to FIG. 1A, the receiver 30A constitutes an interface, together with the transmitter 10 and the transmission path 20 similar to those described with reference to FIG. 1A.

The equalizer 32 of the receiver 30A provides a function of shaping the waveform of a reception signal that is distorted by the frequency characteristics of the transmission path 20. Specifically, the equalizer 32 controls the gain of a predetermined frequency band of the reception signal, where the gain can be controlled depending on the frequency band.

Figure 3A:
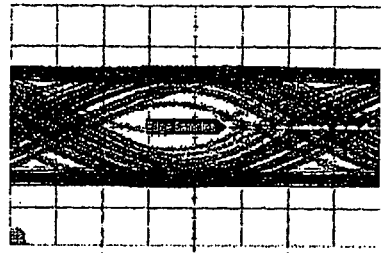

Referring to FIGS. 3A through 3F, the characteristics of the equalizer 32 are described. FIG. 3A depicts a waveform of the reception signal received by the receiver 30A from the transmitter 10 via the transmission path 20, including an eye pattern. As in the case of FIG. 1E, in comparison to the transmitting-end waveform from the transmitter 10 that is depicted in FIG. 1C, the amplitude of an eye portion in the eye pattern is reduced by a jitter caused by distortion in the frequency characteristics of the transmission path 20.

Figure 3B:
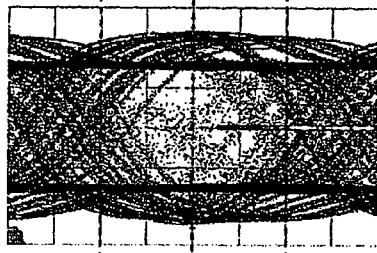
Figure 3C:
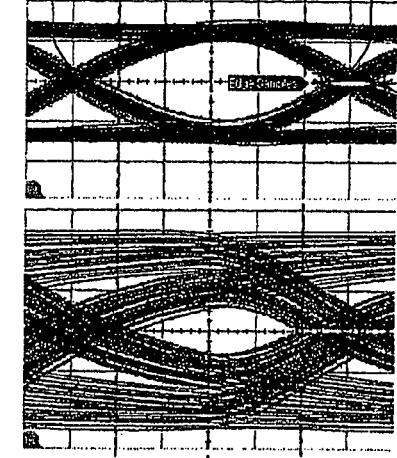
Figure 4:
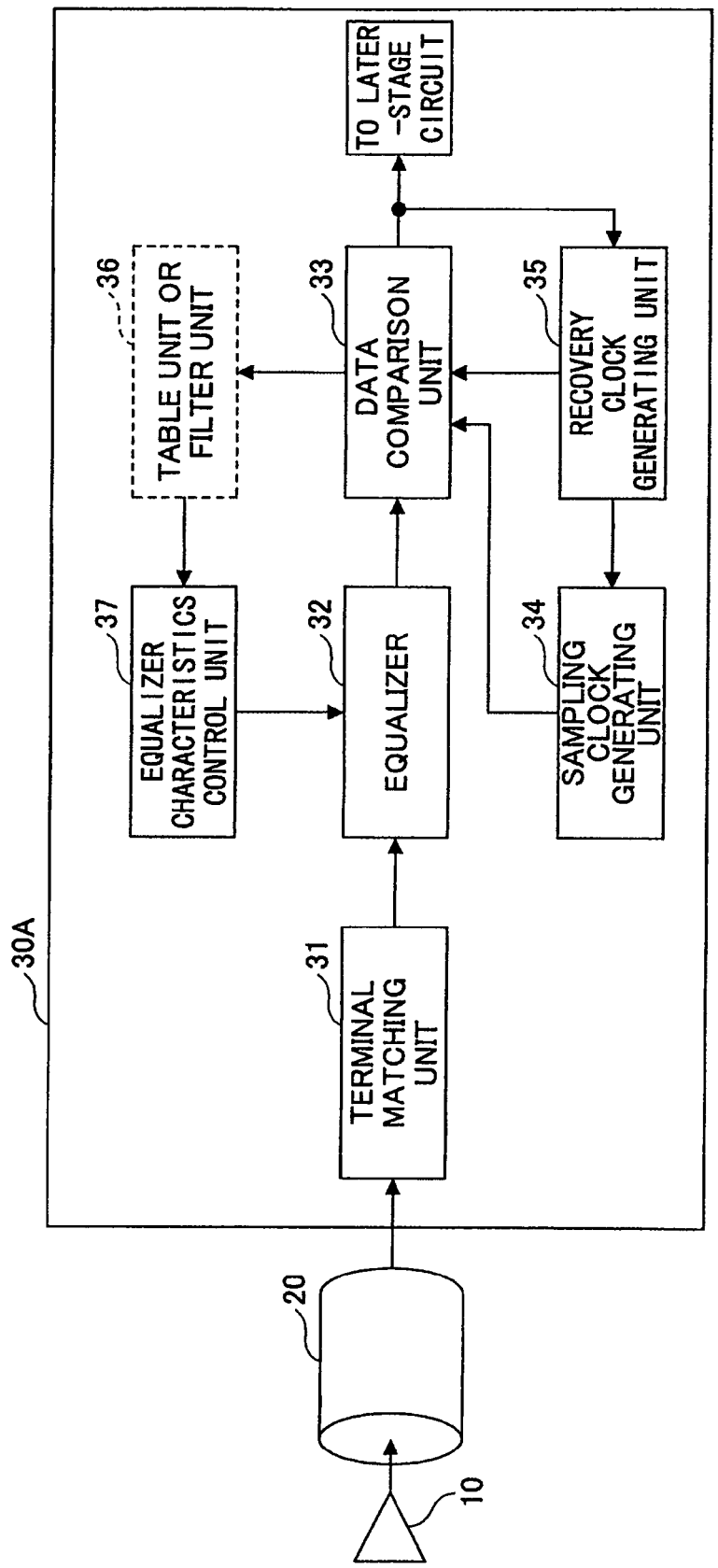
FIG. 4 is a block diagram of a receiver for realizing the operation of FIG. 2.

FIGS. 3B, 3C, and 3D depict examples of the reception signal after waveform shaping by the equalizer 32. FIG. 3B depicts an example where the control amount of the equalizer 32 is excessive. FIG. 3C depicts an example where the control amount of the equalizer 32 is appropriate. FIG. 3D depicts an example where the control amount of the equalizer 32 is too little.

As depicted in FIG. 3C, when the control amount of the equalizer 32 is appropriate, the jitter is reduced and the reduced amplitude of the eye portion is corrected. As a result, the central space of the eye portion, i.e., the area with an increased amplitude of the eye portion in the vertical axis direction, is obtained widely along the horizontal axis, i.e., in the time direction. In this case, when the reception signal is latched at the rise timing of a recovery clock signal depicted in FIG. 3E, the reception signal data can be correctly reproduced even if the timing is shifted along the time axis to some extent, thus effectively reducing the probability of an error.

When the control amount of the equalizer 32 is too strong, as depicted in FIG. 3B, or when the control amount of the equalizer 32 is too little as depicted in FIG. 3D, the jitter is not reduced enough and/or the correction of the amplitude decrease is insufficient compared with the case of FIG. 3C where the control amount of the equalizer 32 is appropriate.

In these states, i.e., when the area with an increased amplitude of the eye portion is narrow in the time direction or when the amplitude of the eye portion is small, it becomes difficult to correctly reproduce the reception signal if the aforementioned timing is shifted along the time axis upon latching the reception signal at the rise timing of the recovery clock signal, thus resulting in an increased likelihood of an error.

Thus, it is necessary to optimize the characteristics of the equalizer 32, i.e., to set an appropriate control amount for the equalizer 32, so that the reception signal can be correctly reproduced and an error can be minimized.

Figure 3E:
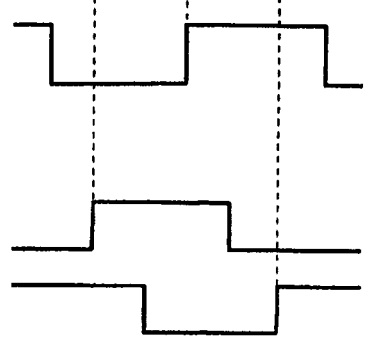
Figure 3F:

The recovery clock signal depicted in FIG. 3E, which is generated by the recovery clock generating unit 35, is controlled so that the reception signal can be latched at a correct logic and correctly reproduced.

Specifically, the recovery clock generating unit 35 generates the recovery clock signal such that an intermediate point between cross points CP1 and CP2 on either side of the eye pattern depicted in FIG. 3C is aligned with the rise timing ("recovery clock timing") of the recovery clock signal. Such an operation in which a clock timing is extracted from a reception signal to generate the recovery clock signal is referred to as "clock recovery".

The intermediate point between the cross points CP1 and CP2 substantially corresponds to the maximum amplitude portion of the eye portion of the eye pattern. Thus, by latching the reception signal at this timing, the reception signal can be reproduced more accurately.

A method for determining the cross points CP1 and CP2 is described below. Initially, a recovery clock signal having an arbitrary phase is generated, and a sampling clock signal is generated by shifting the phase of the recovery clock signal by a predetermined amount, as will be described later. A reception signal is then latched at the rise timing of each (i.e., at the recovery clock timing and a sampling clock timing). Logic values of the reception signal thus obtained are then compared.

As long as the comparison result indicates that the logic values correspond to each other, both the recovery clock timing and the sampling clock timing are within the eye portion. When the logic values do not correspond to each other, either the recovery clock timing or the sampling clock timing has drifted out of the eye portion.

This phenomenon is taken advantage of by gradually shifting the phase of the sampling clock timing with respect to the recovery clock timing. The sampling clock timing at a point of change between correspondence and non-correspondence in the logic value comparison result is obtained as the cross point CP1 or CP2 of the eye pattern.

Figure 13:
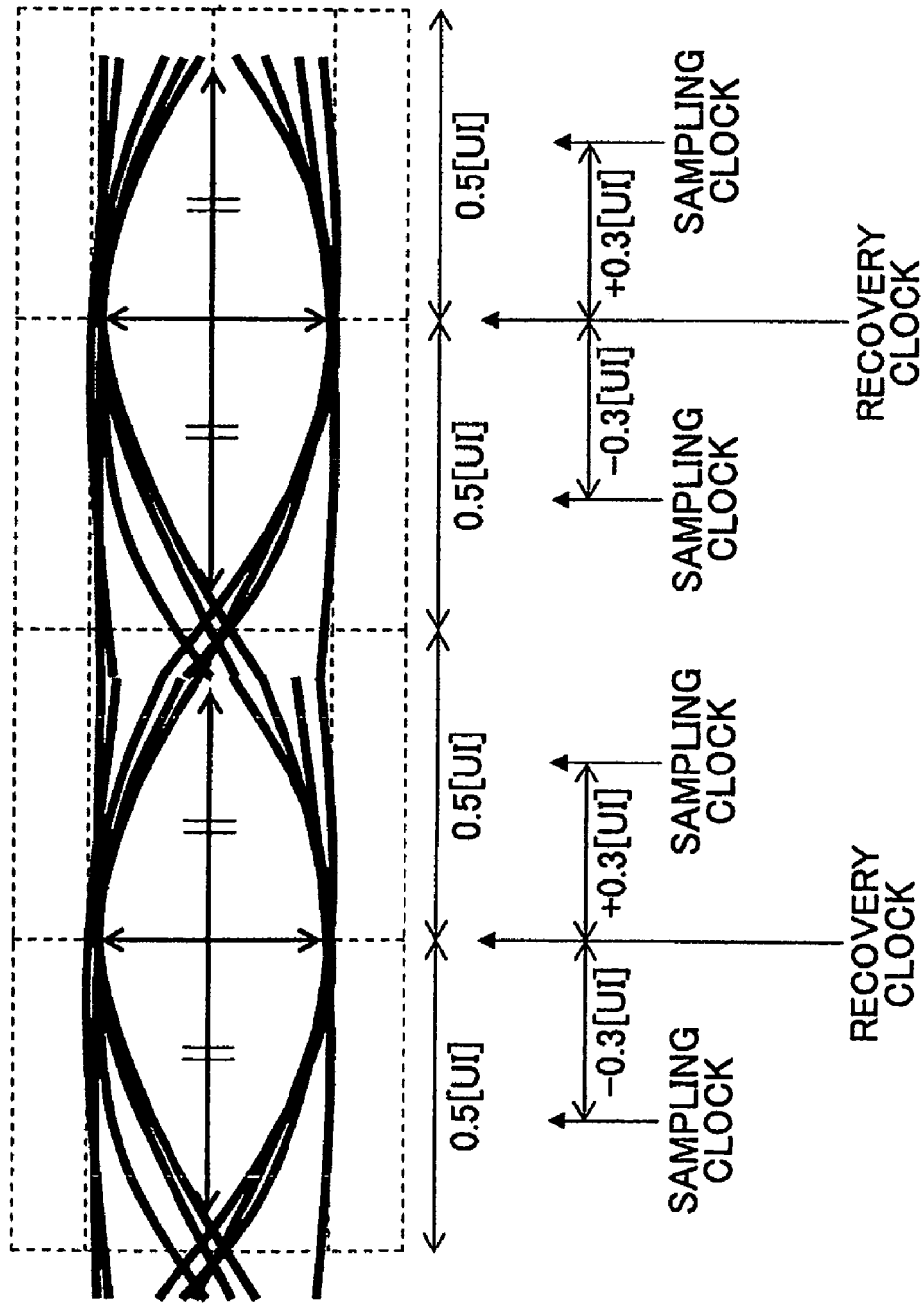
FIG. 13 depicts a chart for describing a recovery clock signal and a sampling clock signal according to an embodiment of the present invention.

Referring back to FIG. 4, the sampling clock generating unit 34 generates two clock signals (i.e., sampling clock signals) whose phases are shifted symmetrically along the time axis within ±0.5 UI (unit interval) of the recovery clock signal at the center. The "UI" refers to a unit of time equal to a time interval corresponding to one bit of data carried by a signal transferred by the interface depicted in FIG. 4. For example, as depicted in FIG. 13, the two sampling clock signals have the two sampling clock timings at ±0.3 UI with respect to the recovery clock timing at the center.

Figure 5:
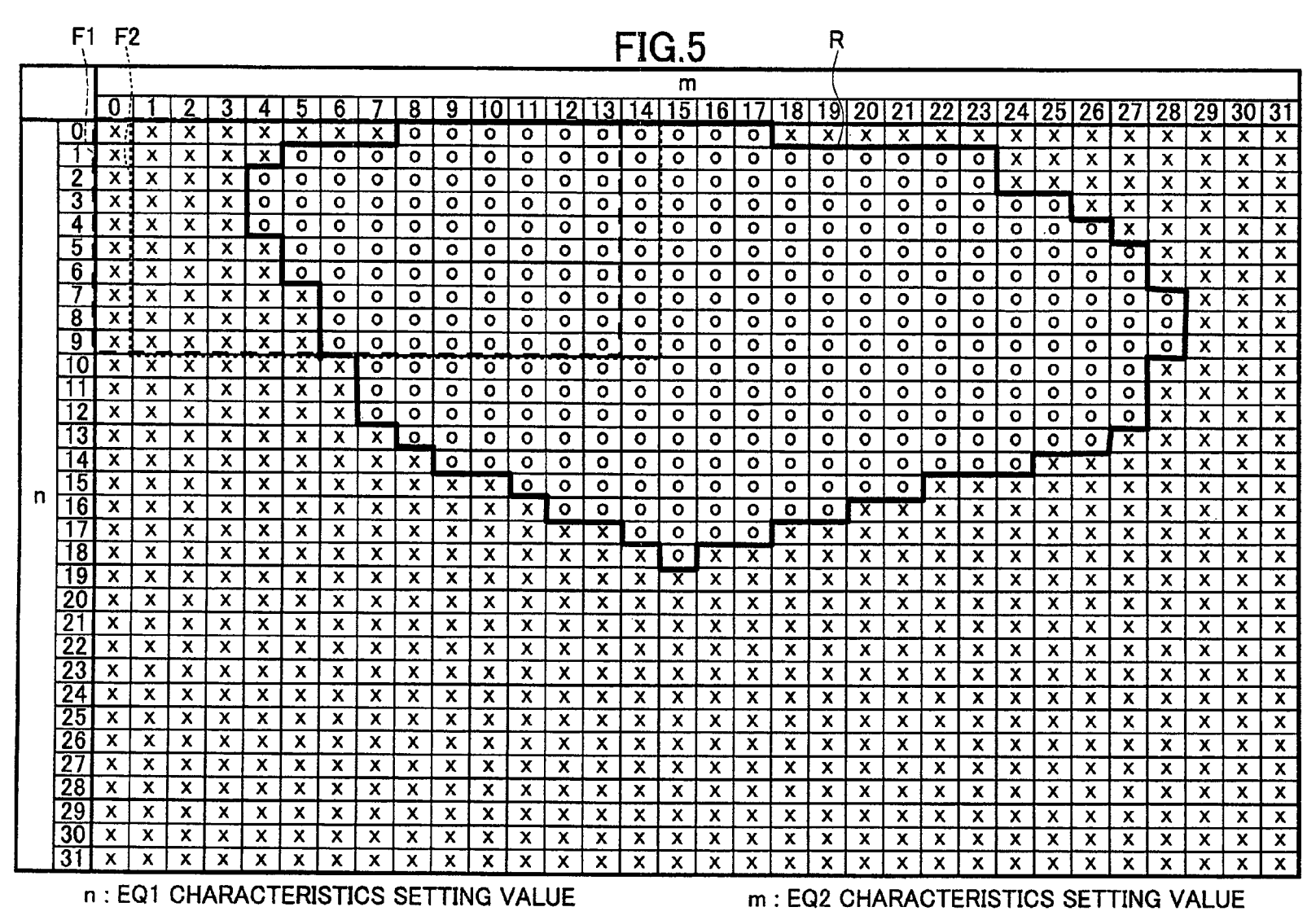

The data comparing unit 33 latches the waveform of the reception signal shaped by the equalizer 32 at the clock timing of the recovery clock signal and at the clock timings of the two sampling clock signals, i.e., at the recovery clock timing and the two sampling clock timings. The data comparing unit 33 then compares logic values of the reception signal obtained by the latching at each clock timing to each other. Based on a result of the comparison, a table of data depicted in FIG. 5 is generated, for example, as will be described later. By determining an error in the latching at the recovery clock timing and the sampling clock timings having different phases, i.e., by determining the presence or absence of non-correspondence in the result of comparison of the logic values, the appropriateness of the characteristics of the equalizer 32 is determined.

In FIG. 5, the circles indicate the absence of error, i.e., the cases where the logic values obtained by latching at the recovery clock timing and the sampling clock timings correspond to each other. The crosses indicate errors, i.e., the cases where the logic values obtained by the latching at the recovery clock timing and the sampling clock timings do not correspond to each other.

As depicted in FIG. 3C, when the characteristics of the equalizer 32 are appropriate, the eye pattern of the resultant signal has an increased amplitude portion extending widely along the time axis. In this case, it is more likely that both the recovery clock timing and the sampling clock timings are within the eye, so that the logic values obtained with such clock timings correspond to each other (the circles in the table data in FIG. 5).

On the other hand, when the characteristics of the equalizer 32 are inappropriate, the eye pattern of the resultant signal has its increased amplitude portion narrowed along the time axis, or the amplitude of the eye pattern is small, as depicted in FIG. 3B or 3D. As a result, the probability increases that the recovery clock timing is within the eye but one or more of the sampling clock timings are positioned outside the eye. In such a case, the resultant logic values do not correspond to each other (the crosses in the table of data of FIG. 5).

In FIG. 5, "n" refers to a setting value for setting the characteristics of the equalizer 32 for controlling the amplitude of a relatively low-frequency band of the reception signal, while "m" refers to a setting value for setting the characteristics of the equalizer 32 for controlling the amplitude of a relatively high-frequency band of the reception signal, as will be described later with reference to FIG. 11.

The reception signal is latched at the recovery clock timing and the sampling clock timings while the EQ1 characteristics setting value n (0 to 31) and the EQ2 characteristics setting value m (0 to 31) are varied, and the presence or absence of the aforementioned error, i.e., the correspondence or non-correspondence of logic values, is determined, thereby obtaining the data depicted in FIG. 5.

Referring back to FIG. 4, the equalizer characteristics control unit 37 obtains setting values that optimize the characteristics of the equalizer 32 based on the data obtained by the data comparing unit 33 concerning the presence or absence of error. The setting values are then set in the equalizer 32.

Thus, the equalizer characteristics optimizing method according to the present embodiment of the present invention makes it possible to automatically obtain setting values that optimize the characteristics of the equalizer 32 without assistance from either the interface designer or a user, thus eliminating the need for the interface designer, for example, to determine such setting values by conjecture from the error rate of reproduced data through a large number of process steps.

In the following, the equalizer characteristics optimizing method according to the present embodiment is described in greater detail.

In accordance with the equalizer characteristics optimizing method of the present embodiment, the characteristics of the equalizer 32 are optimized in the receiver 30A connected to the transmitter 10 via the transmission path 20. The equalizer 32 controls the amplitude of a predetermined frequency band of a reception signal degraded by the transmission path 20.

The receiver 30A includes the matching terminal unit 31 having a function of preventing the reflection of the reception signal by characteristic impedance matching; the equalizer 32 capable of controlling the gain of a predetermined frequency band as desired; the recovery clock generating unit 35 for generating the recovery clock signal from the reception signal shaped by the equalizer 32 by a clock recovery operation; the sampling clock generating unit 34 for generating 2n (n is an integer of 1 or more; note that the "n" here is not related to the "n" of the aforementioned EQ1 characteristics setting value) sampling clock signals having phases symmetrically shifted within ±0.5 UI with respect to the recovery clock signal at the center; the data comparing unit 33 for comparing logic values obtained by latching the reception signal at the respective clock timings; and the equalizer characteristics control unit 37 for determining setting values that optimize the characteristics of the equalizer 32 based on a logic value comparison result from the data comparing unit 33, and setting the setting values in the equalizer 32.

By using the 2n sampling clock signals, 2n logic value comparison results are obtained by the data comparing unit 33 for each setting of the characteristics of the equalizer 32. In this case, it may be determined that there is no error for a particular setting of the characteristics of the equalizer when all of the 2n logic value comparison results obtained for each setting of the characteristics of the equalizer 32 indicate "correspond" (i.e., the circles in the data of FIG. 5). Alternatively, it may be determined that there is no error when a "correspondence ratio" of the logic value comparison results is equal to or more than a predetermined value.

In this way, the logic value obtained by latching the reception signal at the recovery clock timing of the recovery clock signal is compared with the logic value obtained by latching the reception signal at the rise timing of each sampling clock signal, i.e., at the sampling clock timing. Based on a result of the logic value comparison, setting values that optimize the characteristics of the equalizer are obtained and set in the equalizer 32. Thus, the gain of the reception signal that has been degraded by the transmission path 20 is controlled by the equalizer 32 on an individual frequency band basis, thereby compensating the frequency characteristics of the reception signal.

Referring to FIG. 2, a flow of the equalizer characteristics optimizing method according to the present embodiment is described.

In step S1, the receiver 30A receives the reception signal via the transmission path 20. The waveform of the reception signal is then shaped by the equalizer 32 (step S2).

Based on the resultant signal, the recovery clock signal is generated by the recovery clock generating unit (step S3), and the sampling clock signals are obtained by the sampling clock generating unit 34 (step S4).

The data comparing unit 33 latches an output signal of the equalizer 32 at the clock timing of each of the recovery clock signal and the sampling clock signals (step S5), and compares logic values obtained by the latching at the individual timings (step S6).

The table unit 36 then generates table data from a logic value comparison result obtained by the data comparing unit 33. The equalizer characteristics control unit 37 then determines the center of gravity ("C.G.") of an area where the logic value comparison results indicate "correspond" (which is an area R in the case of the table data depicted in FIG. 5) (step S7).

If the logic value comparison result has yet to indicate "correspond", or if there is only one "correspond" result obtained, an amount of discrepancy in the centers of gravity cannot be determined in step S8, which is described later. Thus, in this case, the routine proceeds to step S9 unconditionally, where the setting values for the characteristics of the equalizer 32 are changed (step S9).

Figure 8:
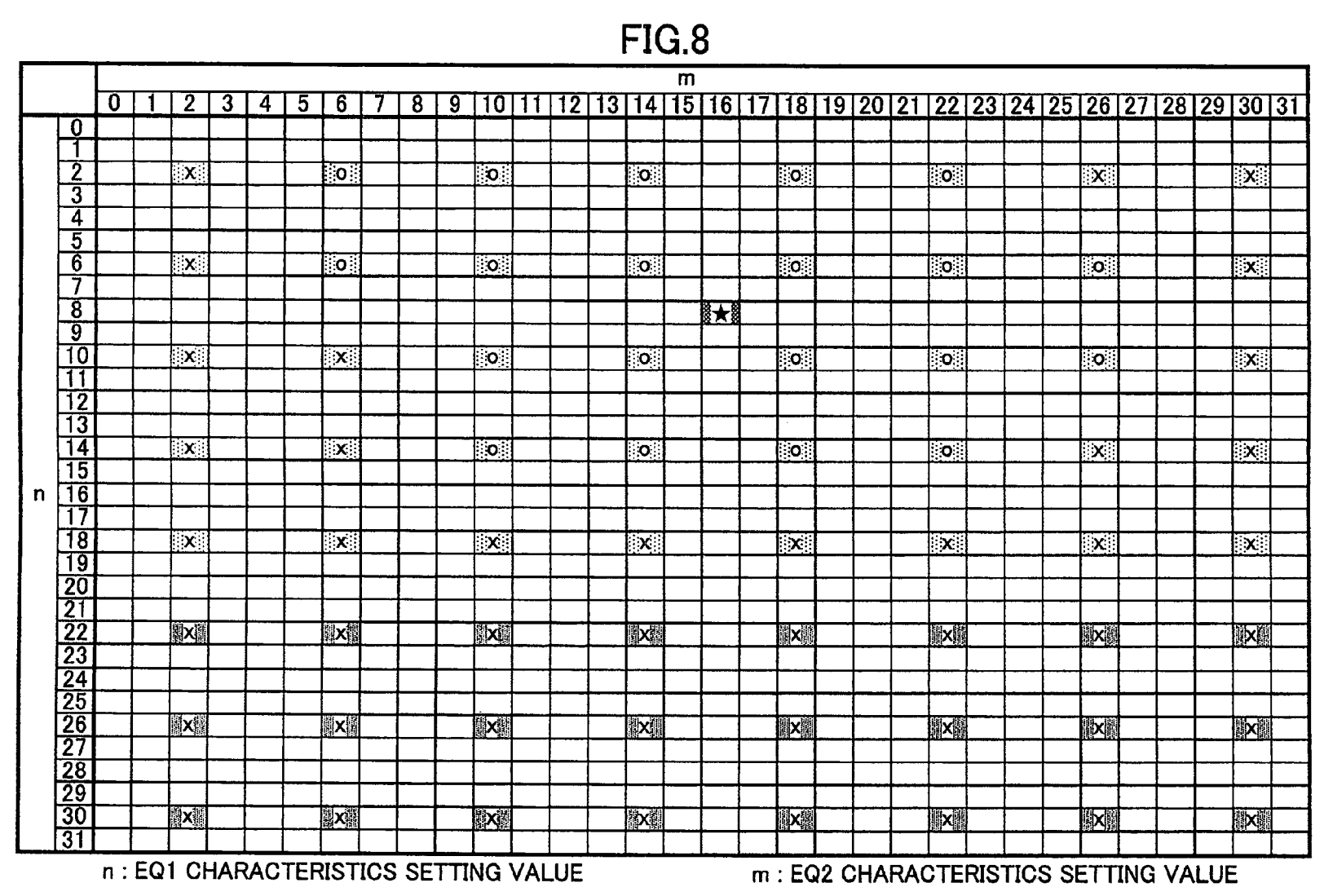

The change in the setting values for the characteristics of the equalizer 32 in step S9 is described below. When obtaining the table data depicted in FIG. 5, for example, n×m=32×32=1024 setting values for the characteristics of the equalizer 32 are successively set. Alternatively, instead of setting all of these 1024 setting values, a predetermined number of the setting values may be selected by skipping the 1024 setting values at certain intervals (such as at every four values for each of n and m, as depicted in FIG. 8) and set successively.

The operation of steps S1 to S7 is repeated with the setting values for the characteristics of the equalizer 32 thus changed. In step S7, table data is generated from the accumulated logic value comparison results, and the center of gravity of the area of the table in which the logic value comparison results indicate "correspond" is determined.

In step S8, the position of the center of gravity obtained in step S7 from the previous loop is compared with the position of the center of gravity obtained in step S7 from the current loop. When a difference between the comparison results (i.e., the amount of discrepancy) is within a certain value ("Yes" in step S8), the operation for optimizing the characteristics of the equalizer 32 is terminated (step S10). In this case, the setting values corresponding to the position of the center of gravity obtained in step S7 are determined to be the setting values that optimize the characteristics of the equalizer 32, and those setting values are set in the equalizer 32 as optimum values.

On the other hand, if the result of determination in step S8 indicates "No", i.e., when the result of comparison of the centers of gravity exceeds a certain value, the setting values for the equalizer 32 are changed in step S9, and the steps S2 through S8 are repeated.

Thus, by the function of the table unit 36, the results of logic value comparison by the data comparing unit 33 concerning the setting of the characteristics of the equalizer 32 are obtained as table data in step S7, and then the center of gravity of an area of the table where the logic value comparison results indicate "correspond" (area R in FIG. 5) is determined.

In the case of the table data depicted in FIG. 5, the EQ1 characteristics setting value n and the EQ2 characteristics setting value m that correspond to the position of the center of gravity of the area R (with the circles) are obtained as optimum setting values for the characteristics of the equalizer 32.

Alternatively, instead of the table unit 36, a filter unit 36 may be provided to successively average a predetermined number of bits of the logic value comparison result obtained by the data comparing unit 33. The resultant average values of the logic value comparison results successively provided by the filter unit 36 are then compared, and the setting values for the equalizer characteristics are increased or decreased to obtain a maximum average value, thereby optimizing the setting for the equalizer characteristics.

In this way, the equalizer characteristics can be obtained whereby a specific jitter or the like produced by the transmission path 20 can be stably compensated.

Hereafter, an operation for successively averaging a predetermined number of bits of the logic value comparison result from the data comparing unit 33 using the aforementioned filter unit 36 is described. In the case of the example of FIG. 5, by the function of the equalizer characteristics control unit 37, the EQ1 characteristics setting value n and the EQ2 characteristics setting value m are successively varied, and a logic value comparison result is obtained by the data comparing unit 33 each time the values are changed. Then, a predetermined number of the logic value comparison results are averaged.

For example, in FIG. 5, the proportion of the "correspond" results, i.e., the number of circles, in the logic value comparison results included in the area F1 of application of the filter is determined, and the area of application of the filter is changed in a direction in which the proportion (hereafter referred to as a "correspondence ratio") increases (such as toward F2). By repeating such an operation, an area of application of the filter is obtained where the correspondence ratio is maximized. Then, the EQ1 characteristics setting value n and the EQ2 characteristics setting value m that correspond to the position of the center of gravity of the eventual area (in which the filter is applied) are obtained as optimum setting values for the characteristics of the equalizer 32.

According to an embodiment of the present invention, the sampling clock generating unit 34 may be configured as follows. Instead of generating the 2n sampling clocks whose phases are symmetrically shifted within ±0.5 UI with respect to the recovery clock signal at the center, n sampling clocks may be generated in which the phase is shifted in either the leading or lagging direction alone with respect to the recovery clock signal.

Alternatively, the sampling clock signal may be swept within a certain phase shift range so that the characteristics of the equalizer can be optimized more finely. The details of an operation in this case will be described later with reference to FIG. 8.

As depicted in FIG. 3C, when the area with an increased amplitude of the eye portion extends widely along the time axis, i.e., when the setting values for the characteristics of the equalizer 32 are appropriate, a relatively stable result of latching at the sampling clock timing can be obtained if the sampling clock timing is positioned away from the center of the eye portion and is near the aforementioned cross point. On the other hand, if the area with an increased amplitude of the eye portion is narrow along the time axis, or if the amplitude of the eye portion is small, as depicted in FIG. 3B or 3D; namely, when the setting values for the characteristics of the equalizer 32 are inappropriate, the result of latching at the sampling clock timing tends to be destabilized if the sampling clock timing is positioned away from the eye and is near the cross point, resulting in a greater probability of the latching result failing to correspond to the latch result obtained at the recovery clock timing.

Thus, the setting values for the characteristics of the equalizer 32 are closer to an optimum state the higher the correspondence ratio of the logic value comparison result that is obtained when the phase of the sampling clock signal is gradually changed or swept with respect to the recovery clock timing. Therefore, the setting values for the characteristics of the equalizer 32 can be more accurately optimized by determining the center of gravity of the setting values for the characteristics of the equalizer 32 by using a value indicating the correspondence ratio of the logic value comparison result as a weight.

In the following, the flow of an operation according to an embodiment of the present invention is described in detail. Initially, with reference to FIG. 6, the flow of an operation in the absence of phase sweep of the sampling clock signal is described.

In step S21, the center of gravity (C.G.) values (n', m') and (n", m") are each cleared to (0, 0).

In step S22, X=2, Y=30, and Z=4 are set as search conditions.

In step S23, the EQ1 characteristics setting value n is gradually changed from X to Y at Z steps.

In step S24, the EQ2 characteristics setting value m is gradually changed from X to Y at Z steps.

In step S25, the output signal of the equalizer 32 is latched at the recovery clock timing, and in step S26 the output signal of the equalizer 32 is latched at the sampling clock timing.

In step S27, the logic values of the output signals from the equalizer 32 obtained by latching in steps S25 and S26 are compared to each other.

In step S28, a result of comparison of the logic values is obtained as table data.

In step S29, it is determined whether the value of m is 28 or more. If the value of m is less than 28, the routine returns to step S24 where the value of m is changed and the loop in the steps S25 through S29 is repeated.

If the value of m in step S29 is 28 or more, the center of gravity values (n', m') of the table data obtained in step S28 are obtained in step S30. In the illustrated example, the center of gravity of the setting values where the logic value comparison results indicate "correspond" is determined as described above.

In the case of FIG. 8, the setting values correspond to the positions of the circles where the logic value comparison results indicate "correspond". Thus, the positions of the circles are regarded as having the coordinates expressed by n and m as coordinate values, and the center of gravity of these coordinate positions is determined. In the example of FIG. 8, the center of gravity of the coordinate positions of the circles is at the position indicated by the star, where the center of gravity values (n', m') are (7.6, 16.0).

Referring back to FIG. 6, in step S31, it is determined whether the thus obtained center of gravity values (n', m') are (0, 0). In step S27, if the logic value comparison result "correspond" is not yet obtained, the center of gravity values cannot be calculated in step S30, and so the center of gravity values (n', m') remain (0, 0)("Yes" in step S31). In this case, the routine directly goes to step S34 where it is determined whether the value n is 28 or more. If the value of n is less than 28, the routine returns to step S23 where the value n is changed, and then the loop of steps S24 through S33 is repeated.

If the result of step S34, i.e., the value of n is 28 or more, the search conditions are changed (such as to X=4, Y=28, and Z=4) in step S35 and then the routine returns to step S23 to repeat the loop of steps S23 through S34.

On the other hand, if the determination result in step S31 indicates that (n', m') is not (0, 0), i.e., the logic value comparison result "correspond" is obtained in step S27, the center of gravity values (n', m') currently obtained in step S30 are compared in step S32 with the center of gravity values (n", m") previously obtained in step S30. It is then determined whether the difference between the center of gravity values is within a predetermined determination value. In step S33, the previous center of gravity values (n", m") are replaced by the currently obtained center of gravity values (n', m'), thus updating the previous center of gravity values (n", m").

Figure 7:
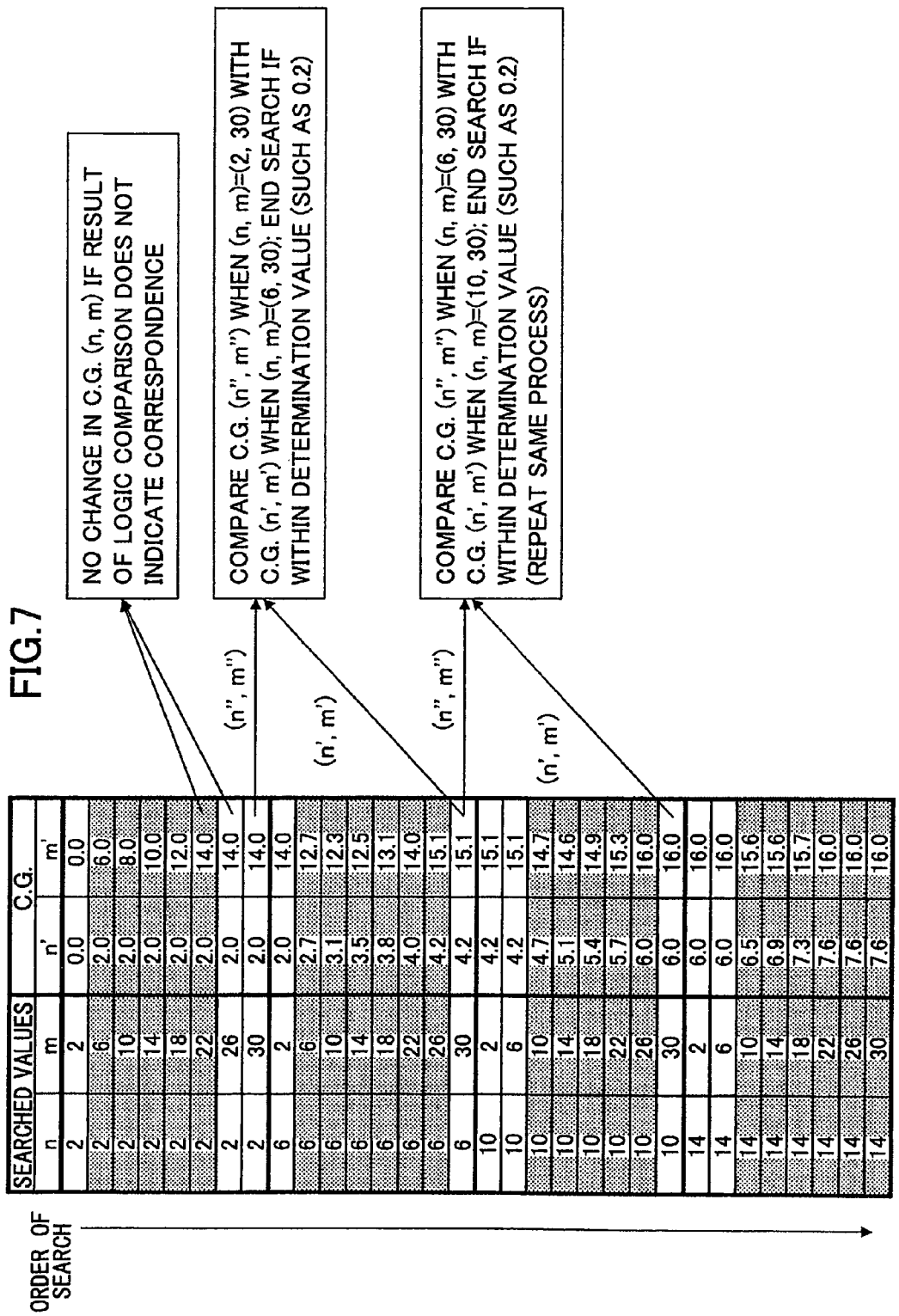
FIG. 7 illustrates a relationship between a change in the center of gravity of logic value comparison result data and a search end determination for obtaining table data during the operation of FIG. 6.

In steps S23 and S24, the setting values for the characteristics of the equalizer 32 are searched successively from the top to the bottom of the table of FIG. 7. Specifically, the value of m is successively incremented for each value of n (step S24), and the value n is updated (step S23) upon the value m exceeding 28 ("Yes" in step S29). From there, the value m is similarly successively incremented. This operation is repeated.

Each time the value of n is updated in the above process, the position of the center of gravity (n', m') is compared with the previous position of the center of gravity (n", m")(step S32). For example, in FIG. 8, there are no circles when n=18 and thereafter. This indicates that when n=18 and thereafter, the characteristics of the equalizer 32 are inappropriate and therefore the logic value comparison result "correspond" cannot be obtained in step S27. Thus, the center of gravity values would not change if the search were to be continued.

Thus, by detecting the above status and ending the search, the search can be omitted for the lower part of FIG. 8, specifically the data when n=22 and thereafter, whereby the time required for optimizing the characteristics of the equalizer 32 can be reduced.

In accordance with the present embodiment, the search is terminated even in cases other than the case where there is no change at all between the previous and current center of gravity values in step S32 as long as the difference is within a predetermined determination value.

Specifically, in the example of FIG. 7, by conducting the search up to n=14, the center of gravity values (7.6, 16.0) should be obtained as mentioned above. However, at an earlier stage where the search has been conducted up to n=6 (in the middle of FIG. 7), the center of gravity values (n', m')=(4.2, 15.1) of the loop where (n, m)=(6, 30) are compared with the center of gravity values (n", m")=(2.0, 14.0) of the previous loop where (n, m)=(2, 30). If the difference in the comparison result is below a predetermined determination value, the search is terminated ("Yes" in step S32).

Similarly, in the stage (bottom of FIG. 7) where the search has been completed up to n=10, the center of gravity values (n', m')=(6.2, 16.0) of the loop where (n, m)=(10, 30) are compared with the center of gravity values (n", m")=(4.2, 15.1) of the preceding loop where (n, m)=(6, 30). If the comparison result, i.e., the difference between the center of gravity values, is less than a predetermined determination value, the search ends ("Yes" in step S32).

Thus, the search is terminated when the difference value obtained as a result of the comparison of the center of gravity values in step S32 is less than a predetermined determination value. In other words, the search is terminated even when the accuracy is less than what it would be if the search were to be continued, as long as the accuracy of optimization is within a permitted range. Thus, the time required for optimization of the characteristics of the equalizer 32 can be effectively reduced.

Figure 9:
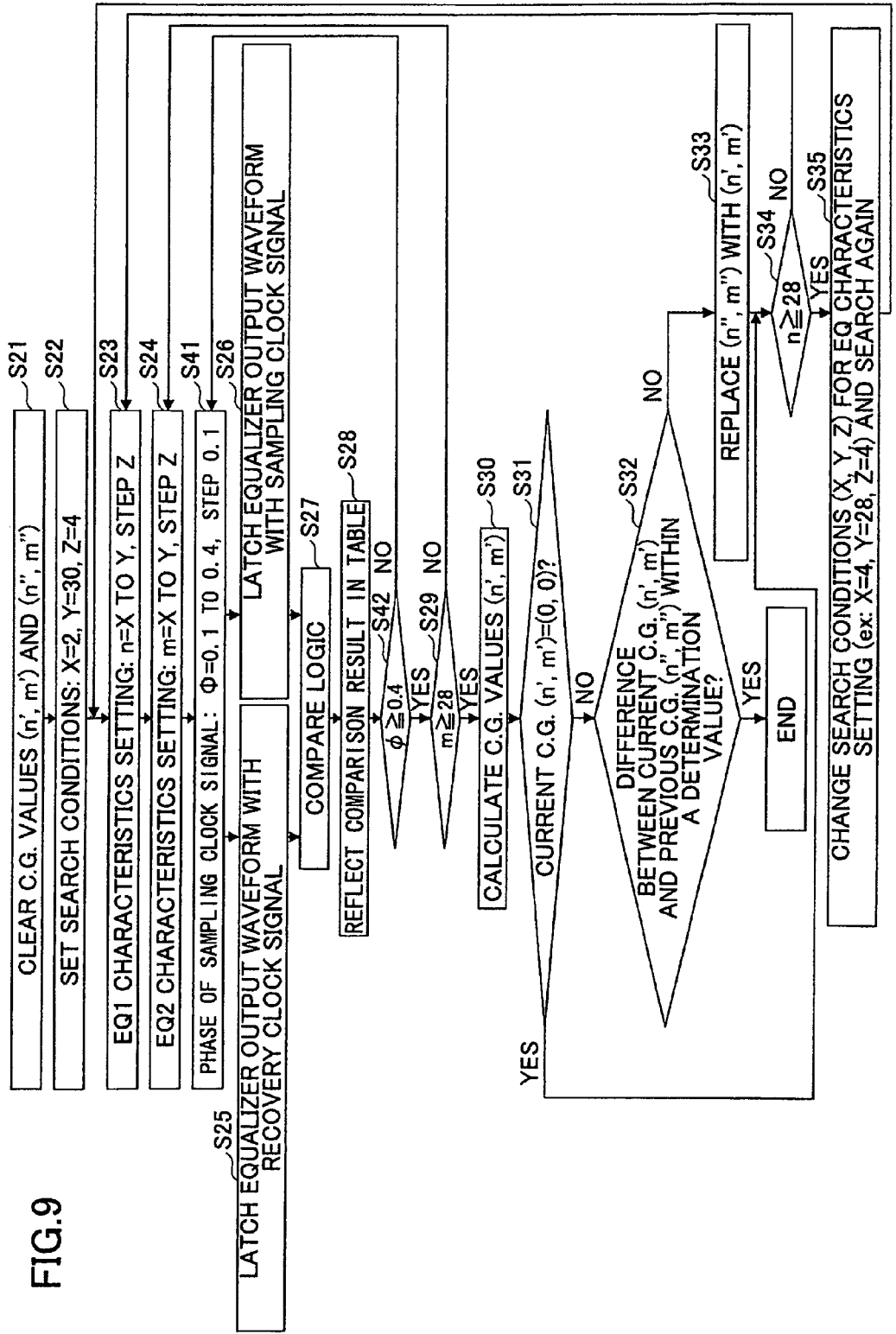
FIG. 9 is a detailed flowchart of the operation of FIG. 2 (where phase sweep of the sampling clock signal is performed)

In the following, the flow of an operation according to an equalizer characteristics setting value optimization method according to an embodiment of the present invention in which phase sweep of the sampling clock signal is performed as described above is described with reference to FIG. 9.

In step S21, the center of gravity values (n', m') and (n", m") are cleared to (0, 0).

In step S22, search conditions X=2, Y=30, and Z=4 are set.

In step S23, the EQ1 characteristics setting value n is changed from X to Y at Z steps.

In step S24, the EQ2 characteristics setting value m is changed from X to Y at Z steps.

Further, in step S41, the phase of the sampling clock signal relative to the recovery clock signal is changed or "swept" at predetermined width intervals, such as at 0.1 UI, within a range between 0.1 UI to 0.4 UI.

In step S25, the output signal from the equalizer 32 is latched at the recovery clock timing. In step S26, the output signal from the equalizer 32 is latched at the sampling clock timing.

In step S27, logic values of the output signals from the equalizer 32 obtained by latching in steps S25 and S26 are compared to each other.

In step S28, a logic value comparison result is obtained as table data.

In step S42, it is determined whether the phase of the sampling clock signal with respect to the recovery clock signal is equal to or more than 0.4 UI. If the phase is less than 0.4 UI, the routine returns to step S41 where the value of the phase is changed and the operation in steps S25 through S28 and S42 is repeated.

In step S29, it is determined whether the value m is equal to or greater than 28. If the value of m is less than 28, the routine returns to step S24 where the value of m is changed and the operation in steps S41 and S25 through S29 is repeated.

If the value of m is 28 in step S29, the center of gravity values (n', m') of the table data obtained in step S28 are determined in step S30.

In step S31, it is determined whether the resultant center of gravity values (n', m') are (0, 0). If the logic value comparison result "correspond" is not yet obtained in step S27, the center of gravity values cannot be calculated in step S30, and so the center of gravity values (n', m') remain (0, 0)("Yes" in step S31). In this case, the routine proceeds directly to step S34 where it is determined whether the value of n is equal to or greater than 28. If the value is less than 28, the routine returns to step S23 where the value of n is changed and the loop between steps S24 and S33 is repeated.

If the value of n is equal to or greater than 28 in step S34, the search condition is changed in step S35 (such as to X=4, Y=28, Z=4) and the routine returns to step S23 to repeat the loop between steps S23 and S34.

On the other hand, if the result of step S31 indicates that (n', m') is not (0, 0), i.e., the logic value comparison result "correspond" is obtained in step S27, the current center of gravity values (n', m') obtained in step S30 is compared in step S32 with the previous center of gravity values (n", m") obtained in step S30, and it is determined whether the difference is within a predetermined determination value. In step S33, the previous center of gravity values (n", m") is replaced by the currently obtained center of gravity values (n', m'), thus updating the previous center of gravity values (n", m").

In this example, the operation in which the result of logic value comparison in step S27 is obtained in step S28 as table data is performed for each of the setting values n and m a plurality of times (four times in the above case of 0.1 UI) in step S41. Then as depicted in FIG. 10, the number of times that the logic value comparison result is "correspond" is obtained as table data (step S28). Using this number of times as a weight for the setting values for the characteristics of the equalizer 32, the center of gravity values for the characteristics of the equalizer 32 are calculated. As a result, the setting values for the characteristics of the equalizer 32 can be optimized with greater accuracy than when the sampling clock signals are not swept as described with reference to FIG. 6.

FIG. 10 shows a table illustrating a change in the center of gravity position depending on the presence or absence of phase sweep of the sampling clock signal. The numbers in the table indicate the number of times of correspondence in logic values latched with the recovery clock signal and the sampling clock signal. The phase sweep provides weighting.

Figure 6:
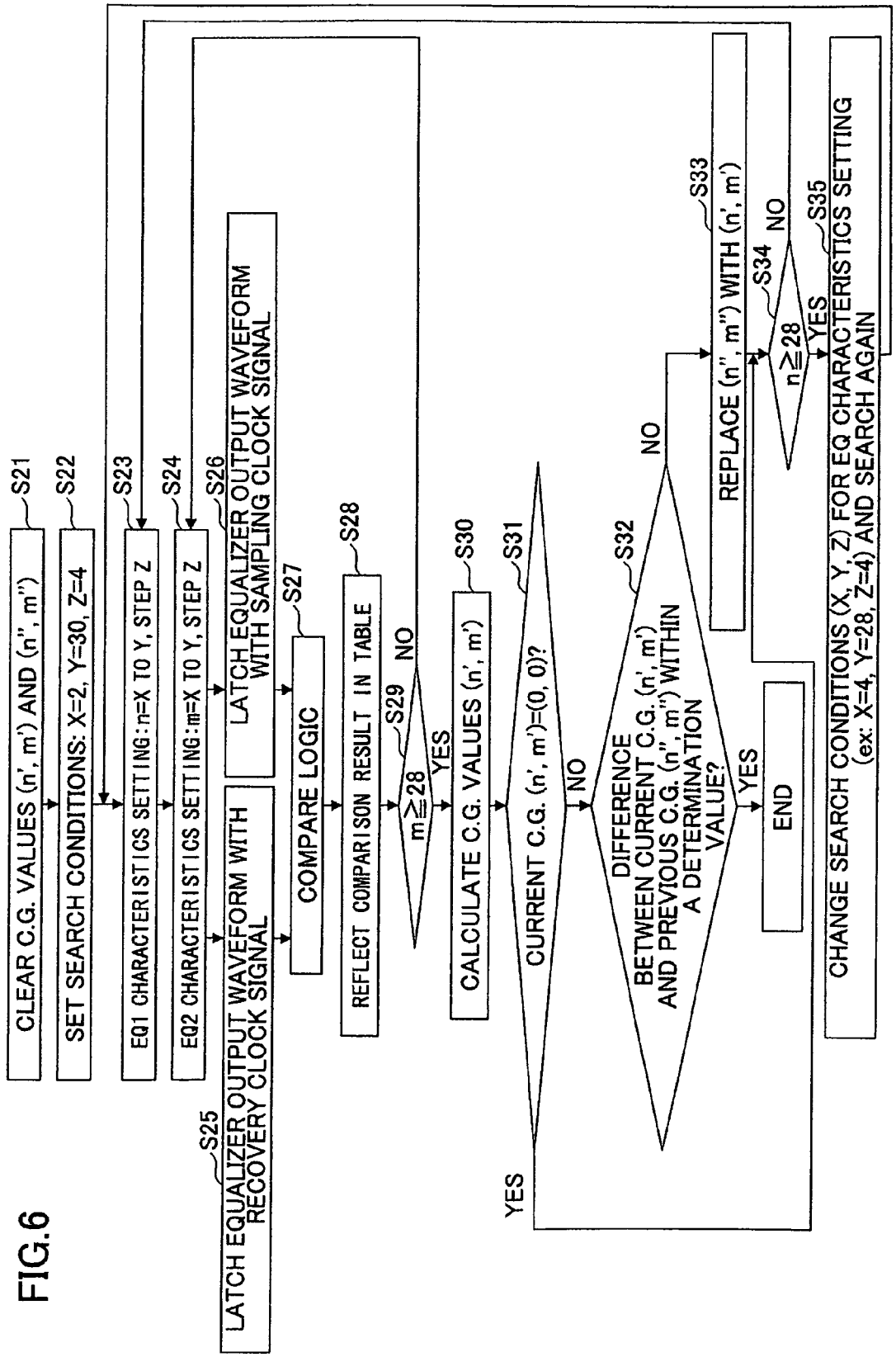
FIG. 6 is a detailed flowchart of the operation of FIG. 2 (where phase sweep of the sampling clock signal is not performed)

Specifically, in the case of FIG. 6 where no phase sweep of the sampling clock signal is performed, the values (n, m)= (7.6, 16.0) are obtained at the location indicated by the white star. On the other hand, in the case of FIG. 9 where phase sweep of the sampling clock signal is performed, the values (n, m)=(7.3, 16.0) are obtained at the location indicated by a black star. The latter values reflect more accurate optimization.

When the phase sweep of the sampling clock signal is performed, the number of times of logic value comparison for each setting value for the characteristics of the equalizer 32 corresponds to the number of times of the phase sweep, so that the optimization process requires a longer time than in the case of no phase sweep. However, by obtaining the table data while using, as a weight, the number of times of correspondence or the correspondence ratio in the logic value comparison result obtained by performing the phase sweep, the characteristics of the equalizer 32 can be optimized more accurately than in the absence of phase sweep.

By using this method, the characteristics of the equalizer 32 can be optimized accurately when, for example, the equalizer 32 of the receiver has a small number of combinations of the setting values (n, m), such as 8×8=16.

The accuracy of optimization of the characteristics of the equalizer 32 may be improved by repeating the characteristics optimization operation described above with reference to FIG. 6 or FIG. 10 a plurality of times (such as three times). Such a method may be particularly effective for a transmission system sensitive to the characteristics of the equalizer 32. When different setting values are obtained as a result of such multiple optimization operations, an average value may be obtained as a final setting value.

In accordance with another embodiment, there may be provided the same number of circuits disposed in parallel for latching the output signal from the equalizer 32 using the sampling clock signal as the number of times (four in the above example) of the phase sweep for each setting of the characteristics of the equalizer 32, so that the output signal from the equalizer 32 can be latched with sampling clock signals from the individual circuits having different phases. In this configuration, the time required for optimization of the characteristics of the equalizer 32 can be effectively reduced.

Thus, in accordance with the foregoing embodiments of the present invention, the characteristics of the equalizer 32 in a receiver can be optimized without assistance from the interface designer, so that the setting values for the equalizer 32 can be optimized as needed in response to a change in the transmission path condition or temperature or process variations. Thus, a high interface transmission quality can be maintained.

Figure 11C:
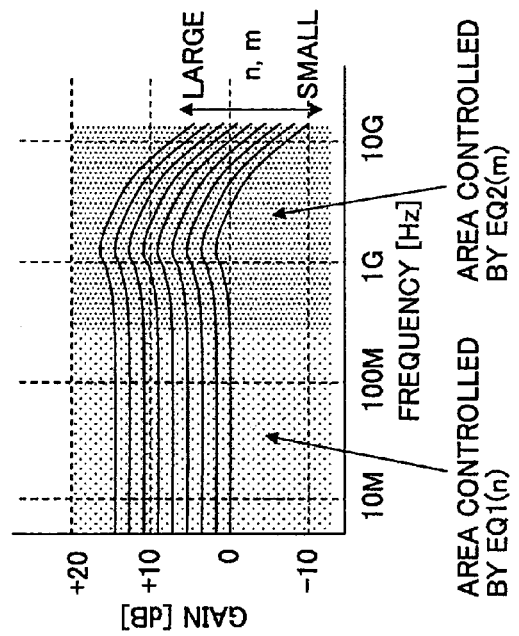
FIGS. 11A through 11C depict charts illustrating the characteristics of an equalizer according to an embodiment of the present invention.
Figure 11A:
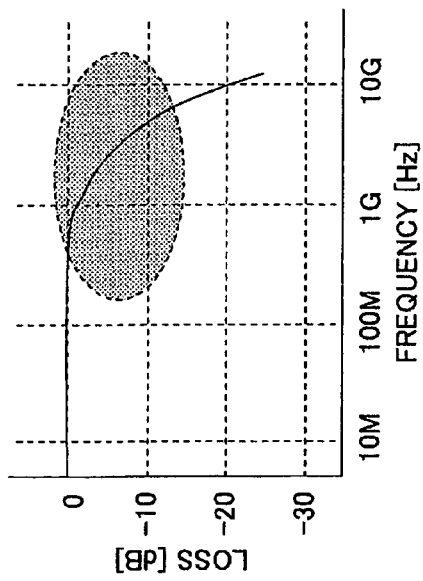
Figure 11B:
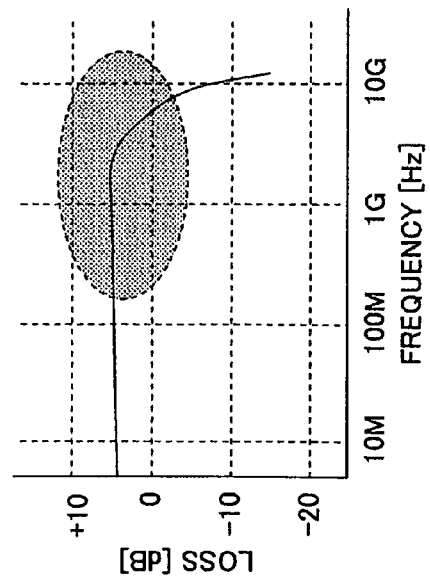

In the following, the characteristics of the equalizer 32 are described in detail with reference to FIGS. 11 and 12. FIGS. 11A and 11B depict graphs illustrating the frequency characteristics of the transmission system of an interface according to an embodiment of the present invention. FIG. 11A depicts the characteristics in the absence of compensation by the equalizer 32. FIG. 11B depicts the characteristics following compensation by the equalizer 32 having the characteristics depicted in FIG. 11C.

In the case of the characteristics of FIG. 11A, transmission loss increases in the high-frequency band between 1 GHz and 10 GHz. In contrast, in the case of FIG. 11B, the gain of the aforementioned band is increased by the equalizer 32, as depicted in FIG. 11C, whereby the frequency characteristics of the transmission system are compensated and the transmission loss in the high-frequency band is reduced to some extent.

Figure 12A:
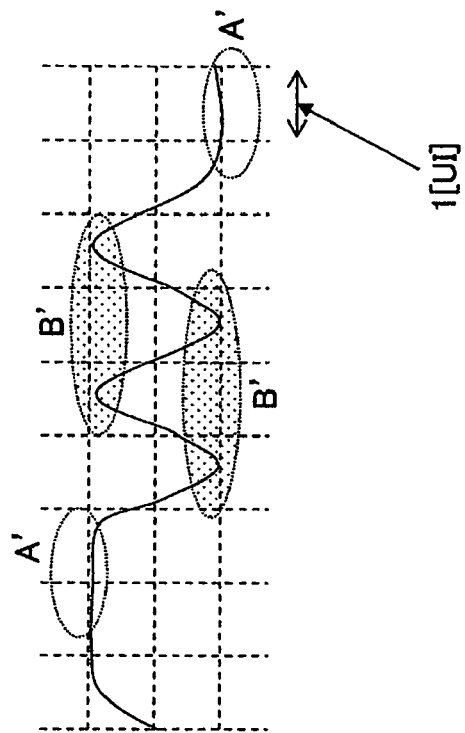
FIGS. 12A through 12D depict other charts illustrating the characteristics of the equalizer.
Figure 12B:
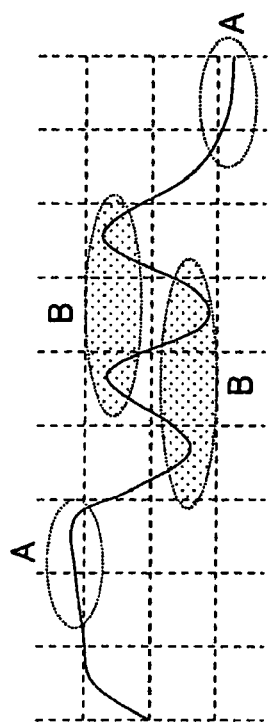

FIG. 12A depicts the receiving-end waveform in the absence of compensation by the equalizer. FIG. 12B depicts a receiving-end waveform compensated by the equalizer 32. As depicted, by utilizing the frequency characteristics compensating function of the equalizer 32, the amplitude of the low-frequency band can be lowered (A→A') by adjusting the EQ1 characteristics setting value, i.e., the value of m, and the amplitude of the high-frequency band can be increased (B→B') by adjusting the EQ2 characteristics setting value, namely the value of n.

Figure 12C:
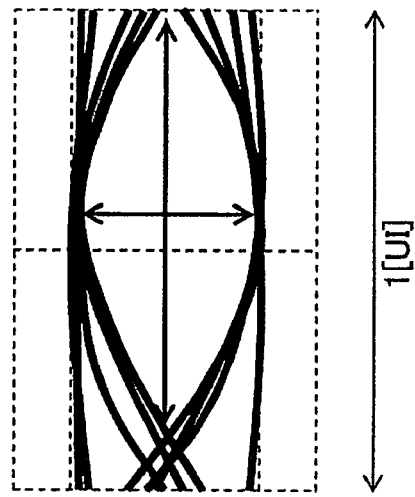

FIG. 12C depicts an eye pattern obtained by folding and overlapping the waveform of FIG. 12A at 1 UI. Similarly, FIG. 12D depicts an eye pattern obtained by folding and overlapping the waveform of FIG. 12B at 1 UI.

Figure 12D:
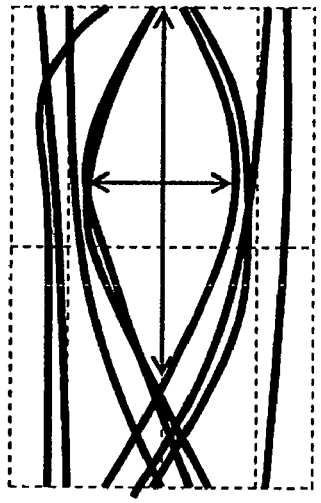

As seen from FIGS. 12C and 12D, the width of the eye portion of the eye pattern that has increased amplitudes is extended along the time axis by adjusting the EQ1 characteristics setting value n and the EQ2 characteristics setting value m, whereby the frequency characteristics of the receiving-end waveform are compensated.

With reference to FIG. 13, the aforementioned recovery clock signal and the sampling clock signal are described. For the sake of simplicity, a waveform over 2 UI is used and it is assumed that the phase of the sampling clock signal is shifted by ±0.3 UI with respect to the recovery clock signal.

Normally, the recovery clock generating unit 35 is designed so that the recovery clock timing is positioned at the center of the cross points at either end of the eye portion. The sampling clock signal may be set or swept within a phase range of ±0.5 UI with respect to the recovery clock signal.

Figure 14:
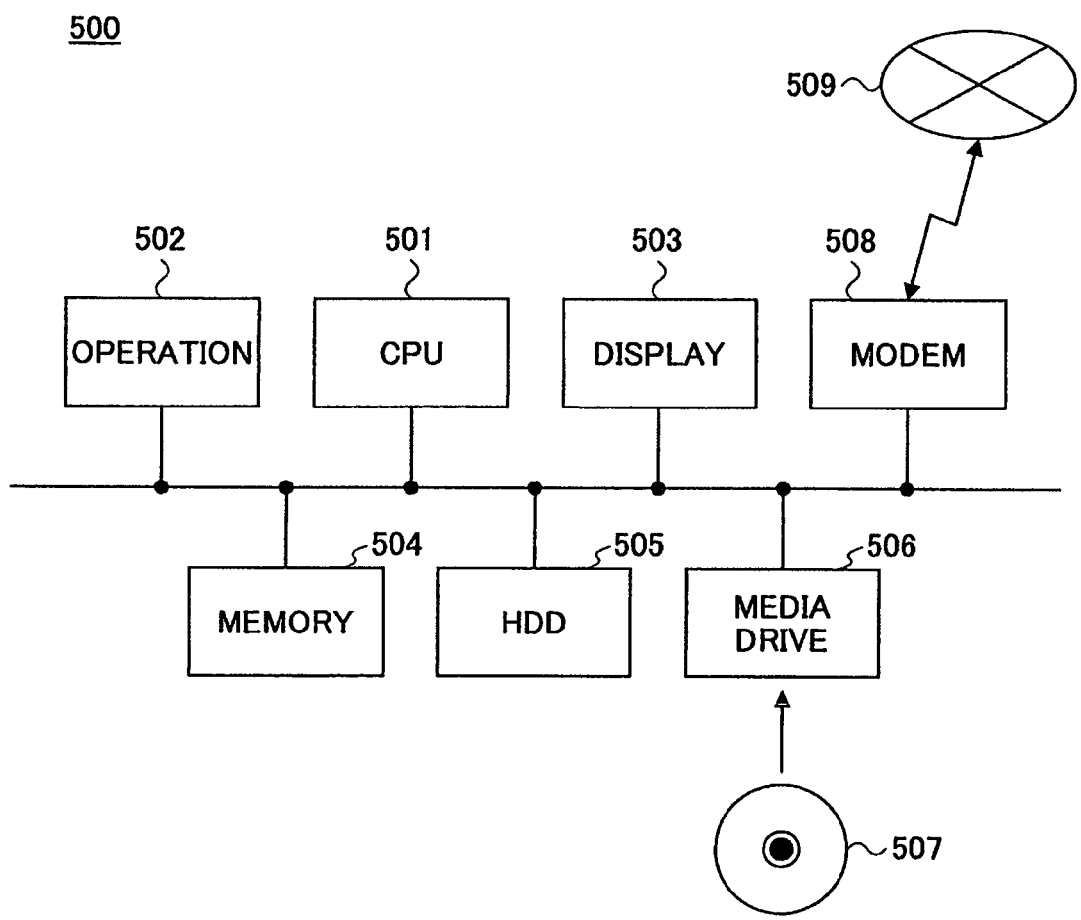
FIG. 14 is a block diagram of a hardware structure of a computer for simulating an operation of a receiver according to an embodiment of the present invention.

FIG. 14 depicts a block diagram of a computer 500 for simulating an operation of the receiver 30A according to an embodiment of the present invention. As depicted in FIG. 14, the computer 500 includes a CPU 501 for performing various operations by executing one or more instructions in a given program; an operating unit 502 which may include a keyboard and mouse for allowing a user to enter an instruction or data; a display unit 503 which may include a CRT or a liquid crystal display unit for displaying to the user a status or a result of a process being performed by the CPU 501; a memory 504 which may include a ROM or a RAM for storing a program or data and the like executed by the CPU 501 or for providing a working area; a hard disk drive 505 for storing a program or data and the like; a CD-ROM drive 506 for loading a program or data externally via a CD-ROM 507; and a modem 508 for downloading a program from an external server, for example, via a communication network 509, such as the Internet or a LAN.

A simulation of an operation of the receiver 30A may be realized by the computer 500 as follows. The computer 500 loads or downloads, via the CD-ROM 507 or the communication network 509, a program containing instructions for simulating a process performed by the receiver 30A using the CPU 501. The loaded or downloaded program is then installed in the hard disk drive 505 and loaded to the memory 504 as needed, for execution by the CPU 501.

Thus, the present invention has been described herein with reference to preferred embodiments thereof. While the present invention has been shown and described with particular examples, it should be understood that various changes and modification may be made to the particular examples without departing from the scope of the broad spirit and scope of the present invention as defined in the claims. That is, the scope of the present invention is not limited to the particular examples and the attached drawings.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present disclosure have been described in detail, it should be understood that various changes, substitutions, and alterations could be made hereto without departing from the spirit and scope of the invention.

What is claimed is:

1. An equalizer characteristics optimizing method comprising:

acquiring a recovery clock timing from a reception signal whose frequency characteristics are compensated by an equalizer;

acquiring a predetermined sampling clock timing with respect to the recovery clock timing;

latching, at the recovery clock timing, the reception signal whose frequency characteristics are compensated by the equalizer;

latching, at the sampling clock timing, the reception signal whose frequency characteristics are compensated by the equalizer;

comparing a logic value obtained by the latching, at the recovery clock timing, with a logic value obtained by the latching, at the sampling clock timing;

collecting logic value comparison result data by repeating, after a characteristics setting of the equalizer is changed, the acquiring a recovery clock timing, the acquiring a predetermined sampling clock timing, the latching, at the recovery clock timing, the latching, at the sampling clock timing, and the comparing with regard to the reception signal whose frequency characteristics are compensated by the equalizer with the changed characteristics setting, said collecting including changing the equalizer characteristics setting by independently varying a predetermined first coefficient for controlling a low-frequency band of a frequency characteristics of the equalizer and a predetermined second coefficient for controlling a high-frequency band of a frequency characteristics of the equalizer; and determining an optimum characteristics setting of the equalizer based on the logic value comparison result data collected by the collecting logic value comparison result data, said determining including obtaining a two-dimensional table of comparison results obtained by said comparing and collected by said collecting with respect to the predetermined first coefficient and the predetermined second coefficient, and determining a center of gravity of the comparison results in the two-dimensional table that indicate correspondence of the compared logic values.

2. The equalizer characteristics optimizing method according to claim 1, wherein the acquiring a predetermined sampling clock timing includes acquiring 2n sampling clock timings of which half are shifted in a leading direction and the other half are shifted in a lagging direction symmetrically with respect to the recovery clock timing, where n is an integer of 1 or more.

3. The equalizer characteristics optimizing method according to claim 1, wherein the acquiring a predetermined sampling clock timing includes acquiring the sampling clock timing in either a leading or a lagging direction alone with respect to the recovery clock timing.

4. An equalizer characteristics optimizing method comprising:

comparing logic values obtained by latching, at a recovery clock timing and a sampling clock timing, a reception signal whose frequency characteristics are compensated by an equalizer;

generating the recovery clock timing based on a comparison result obtained by the comparing;

generating the sampling clock timing with respect to the recovery clock timing;

collecting logic value comparison result data by repeating, after a characteristics setting of the equalizer is changed, the generating the recovery clock timing, the generating the sampling clock timing, the latching, and the comparing with regard to the reception signal whose frequency characteristics are compensated by the equalizer with the changed characteristics setting, said collecting including changing the equalizer characteristics setting by independently varying a predetermined first coefficient for controlling a low-frequency band of a frequency characteristics of the equalizer and a predetermined second coefficient for controlling a high-frequency band of a frequency characteristics of the equalizer; and determining an optimum characteristics setting of the equalizer based on the logic value comparison result data collected by the collecting logic value comparison result data, said determining including obtaining a two-dimensional table of comparison results obtained by said comparing and collected by said collecting with respect to the predetermined first coefficient and the predetermined second coefficient, and determining a center of gravity of the comparison results in the two-dimensional table that indicate correspondence of the compared logic values.

5. A transmission system comprising:

a transmission interface having a function of optimizing characteristics of an equalizer;

a logic value comparing unit configured to compare logic values obtained by latching, at a recovery clock timing and a sampling clock timing, a reception signal whose frequency characteristics are compensated by the equalizer;

a recovery clock generating unit configured to generate the recovery clock timing based on a comparison result obtained by the logic value comparing unit;

a sampling clock generating unit configured to generate the sampling clock timing with respect to the recovery clock timing;

a frequency characteristics control unit configured to change a characteristics setting of the equalizer by independently varying a predetermined first coefficient for controlling a low-frequency band of a frequency characteristics of the equalizer and a predetermined second coefficient for controlling a high-frequency band of a frequency characteristics of the equalizer and thereafter collect logic value comparison result data by repeating generation of the recovery clock timing by the recovery clock generating unit, generation of the sampling clock timing by the sampling clock generating unit, the latching, and comparison of logic values by the logic value comparing unit, with regard to the reception signal whose frequency characteristics are compensated by the equalizer with the changed characteristics setting; and an optimum setting determining unit configured to determine an optimum characteristics setting of the equalizer based on the logic value comparison result data collected by the frequency characteristics control unit by obtaining a two-dimensional table of comparison results obtained by the logic value comparing unit and collected by the frequency characteristics control unit with respect to the predetermined first coefficient and the predetermined second coefficient, and determining a center of gravity of the comparison results in the two-dimensional table that indicate correspondence of the compared logic values.

6. The transmission system according to claim 5, wherein the sampling clock generating unit is configured to generate 2n sampling clock timings of which half are shifted in a leading direction and half are shifted in a lagging direction symmetrically with respect to the recovery clock timing, where n is an integer of 1 or more.

7. The transmission system according to claim 5, wherein the sampling clock generating unit is configured to acquire the sampling clock timing in either a leading or a lagging direction alone with respect to the recovery clock timing.

* * * * *